United States Patent Office 3,064,015
Patented Nov. 13, 1962

3,064,015
16-METHYLENE STEROIDS
Karl-Heinz Bork, Griesheim, near Darmstadt, and Klaus Brückner, Heinz-Jürgen Mannhardt, Harald Metz, and Fritz von Werder, Darmstadt, Germany, assignors to E. Merck Aktiengesellschaft, Darmstadt, Germany
No Drawing. Filed Sept. 19, 1960, Ser. No. 56,703
Claims priority, application Germany Sept. 23, 1959
4 Claims. (Cl. 260—397.45)

The present invention relates to a novel series of 16-methylene steroids which possess a good inflamation arresting action which, for example, far exceeds that of hydrocortisone. The compounds according to the invention are of the following general formula

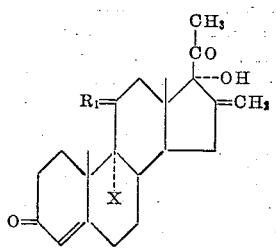

in which $R_1 = \alpha$ —H, $\beta$ —OH or =O; X= or F, and the 1,2 position can contain a further double bond.

These steroids can be produced from 16-methylene-17α-hydroxy-progesterone.

According to the invention 16-methylene-17α-hydroxy-progesterone (I) or its 1-dehydro derivative (II) is treated with a microorganism effecting 11-hydroxylation, whereby 16-methylene - 11,17α - dihydroxy-progesterone (III) or respectively its 1-dehydro derivative (IV) is formed. Insofar as Compound I is used as the starting material it can be subjected to agents affecting 1,2 dehydrogenation either before or after the hydroxylation to obtain the corresponding 1-dehydro Compounds II or IV. To prepare the corresponding 9α-fluoro compound, the 16-methylene-11,17α-dihydroxy-progesterone (III) or its 1-dehydro derivative IV is treated with a conventional dehydrating agent and then, if desired, after esterification of the 17α-hydroxy group, sequentially with hypochlorous or hypobromous acid, a hydrogen halide cleaving agent and hydrogen fluoride. The 17-acyloxy group can be hydrolysed in any desired reaction step. In addition a 1,2 double bond may be introduced in any desired reaction step with the aid of a conventional 1,2 dehydrogenating agent. In the corresponding intermediate or end products the 11-hydroxy group can be converted into a keto group with a known oxidation procedure. Compounds of the above general formula are thus produced.

A preferred embodiment of the process according to the invention is represented by the following reaction scheme:

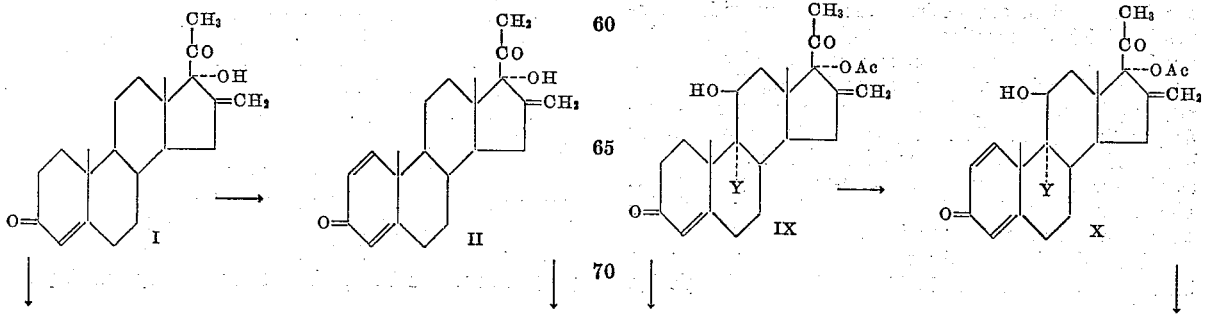

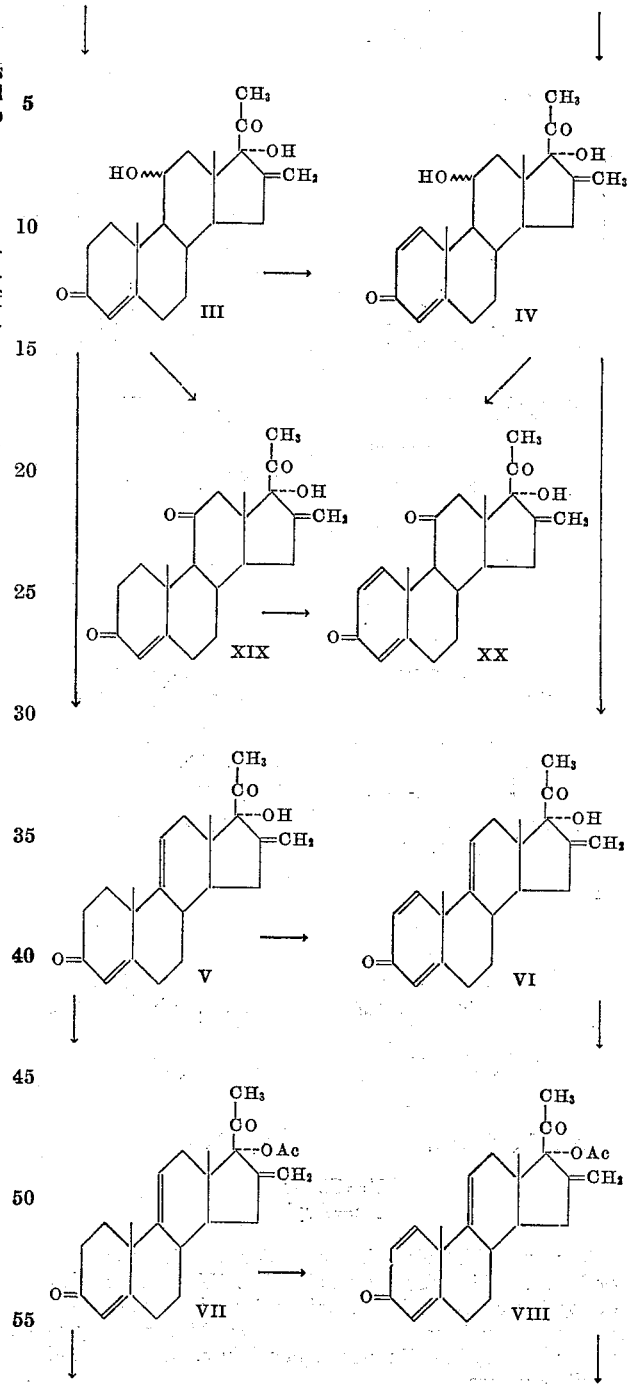

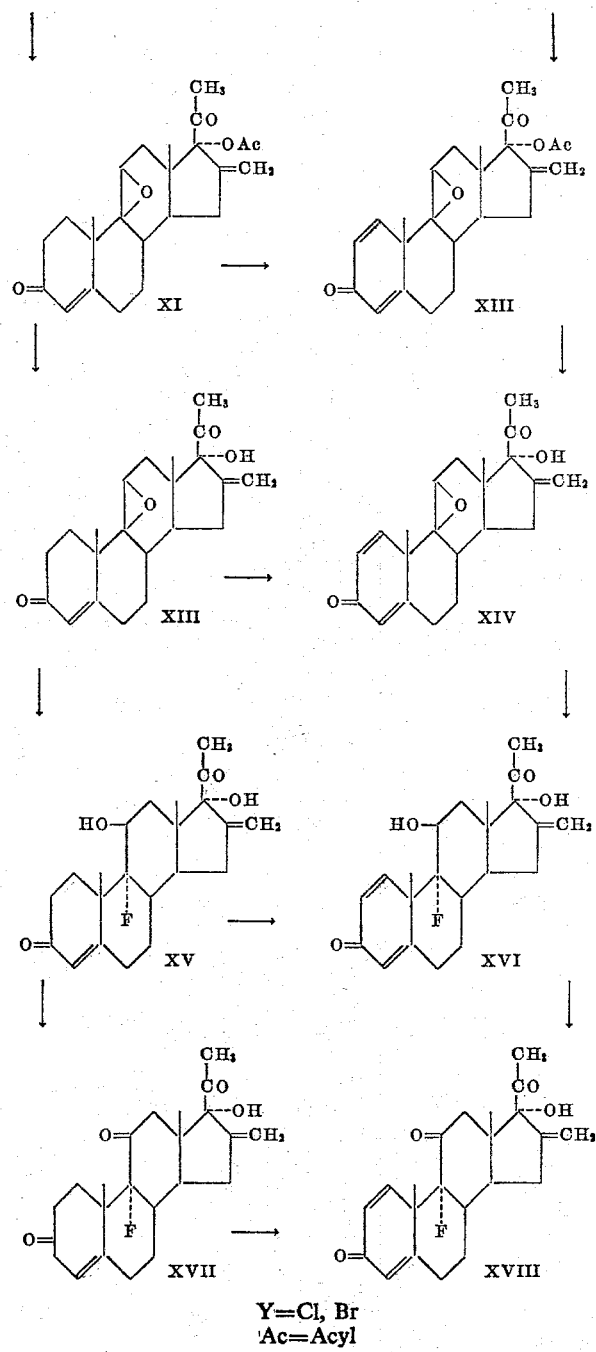

Y=Cl, Br
Ac=Acyl

The microbiological hydroxylation of Compounds I or II to the 11-hydroxy steroids III or IV can be carried out with the usual microorganisms for this purpose, such as microorganisms of the Curvularia, Mucor, Streptomyces, Aspergillus, Fusarium, Pencillium, Rhizopus and Bacillus genera.

The compounds which are saturated in the 1,2 position can be treated in any desired reaction step with a conventional dehydrogenating agent to introduce a 1,2 double bond. The dehydrogenation can be effected chemically or microbiologically. For example, 2,3-dichloro-5,6-dicyan-p-benzoquinone is suited as a chemical dehydrogenating agent. The dehydrogenation advantageous is carried out in the presence of a suitable solvent such as dioxane, benzene, ethyl acetate, t-butanol and the like. The reaction periods lie between 4 and 20 hours during which the reaction mixture is heated under reflux.

All usual microorganisms can be employed for the introduction of the 1,2 double bond microbiologically. Bacillus sphaericus var. fusiformis and Corynebacterium simplex are especially suited therefor. Expediently temperatures of 24 to 40° C. are employed. The 1,2 dehydrogenation products can be extracted from the fermentation medium with chloroform. The substances are isolated in crystalline form by conventional processing of the chloroform extract.

The 11-hydroxy steroids III or IV can be converted into the corresponding 9,11 unsaturated derivatives V or VI by treatment with a dehydrogenating agent. Depending upon whether an 11α or 11β-hydroxy steroid is used as the starting material one uses one of the usual cis- or trans-dehydrogenation methods. In the cis-dehydrogenation one can, for example, esterify the 11α-hydroxy group and subsequently split off the corresponding acid thermally or with basic agents. When an 11β-hydroxy steroid is used as the starting material a smooth trans-dehydrogenation is effected with phosphorous oxychloride or thionylchloride in pyridine.

Expediently the 17-hydroxy group of the thus obtained 16-methylene-9,11-dehydrosteroids V or VI is esterified before the hypochlorous or hypobromous acid is added onto the 9,11 double bond thereof. In this way, side reactions, such as an addition of the hypohalous acid on the exocyclic 16-methylene group, can be avoided. The acylation is effected under usual conditions. Preferably a lower alkonoic carboxylic acid or derivatives thereof suited for esterification are employed for the acylation. Especially good yields can be obtained with acetic acid anhydride and acetic acid in the presence of small quantities of p-toluene sulfonic acid. The thus obtained 16-methylene-17α-acyloxy-9,11-dehydro-progesterone VII or its 1-dehydro derivative VIII can be converted to the corresponding 9α-bromo or 9α-chloro-11β-hydroxysteroid IX or X by treatment with hypobromous or hypochlorous acid or substances yielding such acids, such as N-bromoacetamide, N-bromosuccinimide, N-chloroacetamide or N-chlorosuccinimide. Expediently, a small quantity of a strong acid, preferably, perchloric acid, is added in this reaction. If an excess of hypohalous acid is employed the 9α-halogen-11β-hydroxy-steroids initially formed are converted into the corresponding 9α-halogen-11-keto compounds.

The 9α-halogen-11β-hydroxy-steroids IX and X can be converted into the corresponding 9β,11β-oxido-steroids XI or XII by treatment with alkaline reagents according to methods known per se.

The cleavage of the 9β,11β-oxido-steroids XI or XII to form the 9α-fluoro-11β-hydroxy-steroids XIII or XIV can be effected by treatment with hydrogen fluoride, preferably at low temperatures as well as in the presence of a suitable solvent, such as tetrahydrofurane, chloroform or another chlorinated hydrocarbon.

The saponification of the 17α-acyloxy group can be effected before or after the cleavage of the 9β,11β-epoxide with hydrogen fluoride. The usual alkaline substances used for saponifications of this type, such as sodium hydroxide or sodium carbonate, can be the saponification agent.

The 11-hydroxy-steroids obtained according to the invention can be converted into the corresponding 11-ketosteroids by a usual treatment with a mild oxidizing agent. For example, a mixture of chronic acid anhydride and pyridine, chromosulfuric acid in acetone or hypohalous acid is suited as the mild oxidizing agent.

All components shown in the reaction scheme have not been described previously in the literature.

The 16-methylene-17α-hydroxy-progesterone I required as the starting material can, for example, be prepared from 16-methyl-pregnadienolone-acetate. This compound can be converted to 16α,17α-oxido-16β-methyl-4-pregnene-3,20-dione by treatment with hydrogen peroxide in an alkaline medium and a following oxidation according to Oppenauer. The 16-methylene-17α-hydroxy-progesterone can be obtained therefrom by splitting the epoxide ring with a strong acid in an inert solvent such as p-toluene sulfonic acid in benzene.

The novel compounds according to the invention can be used as mediums for combatting inflamation. They are especially suited for local external application and can be incorporated in powders, salves, solutions, emulsions or lotions with the aid of the usual adjuvants.

The following examples will serve to illustrate the invention.

EXAMPLE 1

(a) 11β-Hydroxylation of I 15 liters of a nutrient solution of 5% of malt extract, 1% saccharose, 0.2% sodium nitrate, 0.1% dipotassium phosphate, 0.05% magnesium sulfate, 0.05% potassium chloride and 0.005% iron (II) sulfate with its pH adjusted to 7 were inoculated with 800 cc. of a shaking culture of Curvularia lunata (Wakker) boadijn in a small fermenter and incubated at 28° C. with strong aeration and stirring. After 24 hours' growth, 5.1 g. of 16-methylene-4-pregnene-17α-ol-3,20-dione (I) in 40 cc. of dimethyl formamide were added. When the conversion was completed the culture was exhaustively extracted with chloroform. The extracts were concentrated and passed through a column of activated silica gel. The pure 16-methylene-4-pregnene-11β,17α-diol-3,20-dione (III, 11β-OH) was obtained from the middle chromatographic fractions. Melting point: 216–217° C., $\lambda_{max}$241mμ;

$E_{1cm.}^{1\%}$ 454; $(\alpha)_D$+42° (chloroform)

(b) 1,2 Dehydrogenation of III 15 liters of a nutrient solution of a 1% yeast extract (pH 6.8) were inoculated with 0.5 liter of a shaking culture of Bacillus sphaericus (collection E. Merck No. 1001) in a small fermenter. After about 11 hours 7.5 g. of 16-methylene-4-pregnene-11β,17α-diol-3,20 dione (III) in 280 cc. of methol were added with constant stirring and aeration. The dehydrogenation which was followed by paper chromatography was completed in 28 to 33 hours. The fermentation liquor was shaken out three times with chloroform and the united extracts concentrated, whereby the 16-methylene-1,4-pregnadiene-11β,17α-diol-3,20-dione crystallized out. Melting point: 238–241° C., $(\alpha)_D$—37.5° (chloroform), $\lambda_{max}$243.5mμ, $E_{1cm.}^{1\%}$ 433

EXAMPLE 2

(a) Microbiological 11α-Hydroxylation of I 15 liters of a nutrient solution of 5% glucose, 0.1% yeast extract, 0.05% soya bean meal, 0.3% sodium nitrate, 0.5% magnesium sulfate, 0.001% iron II sulfate, 1/30 m. phosphate buffer according to Sörensen (pH 5.6) were inoculated with 300 cc. of a shaking culture of Fusarium sp. (collection E. Merck No. 2083) in a small fermenter and incubated at 28° C. with strong aeration and stirring. After 24 hours' growth, 5 g. of 16-methylene-4-pregnene-17α-ol-3,20-dione (I) in 40 cc. of dimethyl formamide were added. After 48 hours' further incubation under the same conditions the culture was shaken out three times with chloroform. The united extracts were concentrated. The 16-methylene-4-pregnene-11α,17α-diol-3,20-dione (III, 11α-OH) crystallized from the residue and was recrystallized from acetone. Melting point: 208–210° C., $\lambda_{max}$241mμ, $E_{1cm.}^{1\%}$ 462, $(\alpha)_D$ — 8.4° (choroform)

(b) Dehydration of III 9.2 g. of 16-methylene-4-pregnene-11α,17α-diol-3,20-dione (11α-OH) were dissolved in 40 cc. of chloroform and 55 cc. of pyridine and 11.2 g. of p-toluene sulfonic acid chloride added while shaking and cooling with ice. The reaction mixture was allowed to stand overnight and was then poured into water, extracted with chloroform and processed in the usual manner. The 11-tosylate crystallized out of the chloroform solution and was recrystallized from methanol. Melting point: 162° C., $(\alpha)_D$—2° (chloroform), $\lambda_{max}$229.5mμ, $E_{1cm.}^{1\%}$ 496

11 g. of the tosylate were heated under reflux in 125 cc. of glacial acetic acid together with 10.3 g. of water free sodium acetate. The reaction mixture was poured into water and the 16-methylene-4,9(11)-pregnadiene-17α-ol-3,20-dione (V) which separated out filtered off under suction and recrystallized from ethyl acetate. Melting point: 227° C.; $(\alpha)_D$—23° (chloroform); $\lambda_{max}$238mμ;

$E_{1cm.}^{1\%}$ 530

(c) Acetylation of V 40 cc. of acetic acid anhydride and 2 g. of p-toluene sulfonic acid were added to a solution of 20 g. of 16-methylene-4,9(11)-pregnadiene-17α-ol-3,20-dione (V) in 200 cc. of glacial acetic acid. The mixture was allowed to stand 18 hours at room temperature and was then slowly poured into water while stirring vigorously. The crude 16-methylene-17α-acetoxy-4,9(11)-pregnadiene-3,20-dione (VII) separated out in the form of crystals and was filtered off under suction and purified by recrystallization from an ether-acetone mixture. Melting point: 232–235° C., $(\alpha)_D$—64.0° (dioxane), $\lambda_{max}$238.5mμ, $E_{1cm.}^{1\%}$ 465

(d) Addition of Hypobromous Acid on VII 5 g. of 16-methylene-17α-acetoxy-4,9(11)-pregnadiene-3,20-dione (VII) were dissolved in 155 cc. of dioxane and 30 cc. of water. 2.9 g. of N-bromosuccinimide and 1.1 cc. of 70% perchloric acid were added to the mixture and the mixture allowed to stand at room temperature for 30 minutes. The mixture was then poured into water with stirring and the precipitate filtered off under suction. The crude 16-methylene-9α-bromo-4-pregnene-11β,17α-diol-3,20-dione-17-acetate (IX) was processed further without purification.

(e) Production of the 9,11 Expoxide XI

The crude 16-methylene-9α-bromo-4-pregnene-11β,17α-diol-3,20-dione-17-acetate (IX) was dissolved in alcohol. The solution was boiled under reflux for 2 hours after the addition of 12 g. of dry potassium acetate. The mixture was poured into water and the resulting emulsion shaken out several times with chloroform. The chloroform solution was dried and concentrated by evaporation. The resulting crude 16-methylene-9β,11β-oxido-4-pregnene-17α-ol-3,20-dione-17-acetate (XI) was purified by recrystallization from ether. Melting point: 194–196° C., $(\alpha)_D$—142.6° (dioxane), $\lambda_{max}$242mμ, $E_{1cm.}^{1\%}$ 397

(f) Saponification of XI 1 g. of 16-methylene-9β,11β-oxido-4-pregnene-17α-ol-3,20-dione-17-acetate (XI) was dissolved in 25 cc. of methanol. The solution was freed of oxygen by boiling with simultaneous introduction of nitrogen. A solution of 0.101 g. of NaOH in 2.4 cc. of water which also was oxygen free was added and the mixture boiled under reflux for 5 minutes. The solution was stirred into water, acidified with sulfuric acid and the resulting precipitate filtered off under suction. The crude 16-methylene-9β,11β-oxido-4-pregnene-17α-ol-3,20-dione (XIII) was purified by recrystallization from ether. Melting point: 172–175° C., $(\alpha)_D$ —122.6° (chloroform), $\lambda_{max}$ 243mμ, $E_{1cm.}^{1\%}$ 398

(g) Cleavage of XIII With HF 6.8 g. of 16-methylene-9β,11β-oxido-4-pregnene-17α-ol-3,20-dione (XIII) were dissolved in 68 cc. of absolute chloroform and cooled to —60° C. 41.4 cc. of a mixture of 40 cc. of tetrahydrofurane, 15 cc. chloroform and 36 g. HF were added to the solution and the mixture allowed to stand for 4 hours at −30° C. and then poured into aqueous sodium bicarbonate. The mixture was extracted several times with chloroform and the united extracts dried and concentrated by evaporation. The residue consisting of crude 9α-fluoro-16-methylene-4-pregnene-11β,17α-diol-3,20-dione (XV) was purified by recrystallization from ether. Melting point: 247–250° C., $(\alpha)_D$ +52.6° (ethanol), $\lambda_{max}$ 238.5mμ, $$E_{1\,cm}^{1\%} 480$$

(h₁) *Microbiological Dehydrogenation of XV*

Analogously to Example 1b, 7.8 g. of 9α-fluoro-16-methylene-4-pregnene-11β,17α-diol-3,20-dione (XV) were dehydrogenated to 9α-fluoro-16-methylene-1,4-pregnadiene-11β,17α-diol-3,20-dione (XVI) with *Bacillus sphaericus*. Melting point: 271–275° C., $(\alpha)_D$ +30.0° (ethanol), $\lambda_{max}$ 238.5mμ, $$E_{1\,cm}^{1\%} 423$$

(h₂) *Chemical Dehydrogenation of XV*

2.5 g. of 9α-fluoro-16-methylene-4-pregnene-11β,17α-diol-3,20-dione (XV) together with 2.5 g. of 2,3-dichloro-5,6-dicyan-p-benzoquinone were dissolved in 50 cc. of dioxane. The mixture was boiled for 8 hours under reflux, then diluted with chloroform and then shaken out sequentially with water, 22 cc. in NaOH and again with water. After drying and concentrating the solution by evaporation the same compound (XVI) as in Example 2h₁ was obtained.

EXAMPLE 3

(a) *Microbiological and Chemical Dehydrogenation of I*

Analogously to 2h₁ and 2h₂, 8.0 g. of 16-methylene-4-pregnene-17α-ol-3,20-dione (I) were dehydrogenated to 16-methylene-1,4-pregnadiene-17α-ol-3,20-dione (II).

(b) *Microbiological 11β Hydroxylation of II*

Analogously to Example 1a, the 16-methylene-1,4-pregnadiene-11β,17α-diol-3,20-dione (IV, 11β-OH) was prepared from 16-methylene-1,4-pregnadiene-17α-ol-3,20-dione (II). The product was identical with that of Example 1b.

EXAMPLE 4

(a) *Oxidation of III*

2.3 g. of 16-methylene-4-pregnene-11α,17α-diol-3,20-dione (III, 11α-OH) were dissolved in 23 cc. of absolute pyridine and a mixture of 2.3 g. of chromic acid anhydride and 23 cc. of pyridine added thereto at 0° C. After 12 hours the reaction mixture was poured into 250 cc. of ethyl acetate, the precipitate filtered off under suction and washed thoroughly with ethyl acetate. The combined ethyl acetate solutions were concentrated whereby the 16-methylene-4-pregnene-17α-ol-3,11,20-trione (XIX) crystallized out. $\lambda_{max}$ 238mμ.

(b) *Oxidation of XV*

4.2 g. of 9α-fluoro-16-methylene-4-pregnene-11β,17α-diol-3,20-dione (XV) were dissolved in 50 cc. of absolute pyridine and mixed with a mixture of 4.2 g. of chromic acid anhydride and 42 cc. of pyridine at 0° C. After 12 hours the reaction mixture was poured into 500 cc. of ethyl acetate, the precipitate filtered off and washed thoroughly with ethyl acetate. The combined ethyl acetate solutions were concentrated whereby the 9α-fluoro-16-methylene-4-pregnene-17α-ol-3,11,20-trione (XVII) crystallized out.

(c) *Oxidation of XVI*

Analogously to Example 4b, the 9α-fluoro-16-methylene-1,4-pregnadiene-17α-ol-3,11,20-trione (XVIII) was prepared from 9α-fluoro-16-methylene-1,4-pregnadiene-11β,17α-diol-3,20-dione (XVI).

We claim:
1. 9α-fluoro-16-methylene - 4 - pregnene-11β,17α-diol-3,20-dione.
2. 9α-fluoro-16-methylene - 1,4 - pregnadiene-11β,17α-diol-3,20-dione.
3. 16-methylene-4-pregnene-17α-ol-3,11,20-trione.
4. 16-methylene-1,4-pregnadiene-17α-ol-3,11,20-trione.

References Cited in the file of this patent

UNITED STATES PATENTS

| | | |
|---|---|---|
| 2,865,808 | Agnello et al. | Dec. 23, 1958 |
| 2,915,433 | Agnello et al. | Dec. 1, 1959 |

OTHER REFERENCES

Taub et al.: 82 J.A.C.S., 4012–4026 (August 1960).